United States Patent
Gordon et al.

(10) Patent No.: US 11,489,554 B2
(45) Date of Patent: Nov. 1, 2022

(54) SYSTEMS AND METHODS FOR ESTABLISHING SECURE COMMUNICATION IN AN ELECTRIC POWER DISTRIBUTION SYSTEM WITH SOFTWARE DEFINED NETWORK

(71) Applicant: Schweitzer Engineering Laboratories, Inc., Pullman, WA (US)

(72) Inventors: Colin Gordon, Katy, TX (US); Duane C. Skelton, Bellingham, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 266 days.

(21) Appl. No.: 17/085,812

(22) Filed: Oct. 30, 2020

(65) Prior Publication Data

US 2022/0140863 A1    May 5, 2022

(51) Int. Cl.
    *H04B 3/54*    (2006.01)
    *H04L 9/08*    (2006.01)

(52) U.S. Cl.
    CPC .............. *H04B 3/546* (2013.01); *H04B 3/544* (2013.01); *H04L 9/0858* (2013.01)

(58) Field of Classification Search
    CPC ....... H04B 3/546; H04B 3/544; H04L 9/0858; H04L 9/0819; H04L 9/088; H04L 9/0838; H04L 9/12; H02J 3/005
    See application file for complete search history.

(56) References Cited

U.S. PATENT DOCUMENTS

| | | | |
|---|---|---|---|
| 7,729,276 B2 | 6/2010 | Akyol | |
| 2006/0289659 A1* | 12/2006 | Mizushima | G06F 21/77 235/492 |
| 2007/0143593 A1* | 6/2007 | Cardoso | H04L 9/12 713/150 |
| 2010/0306533 A1* | 12/2010 | Phatak | H04L 63/107 713/168 |
| 2012/0151219 A1* | 6/2012 | Ryu | H04L 9/0897 713/185 |
| 2014/0304500 A1* | 10/2014 | Sun | H04L 63/061 713/153 |
| 2015/0378382 A1* | 12/2015 | Phatak | G06F 21/34 700/295 |
| 2019/0116183 A1* | 4/2019 | Hussain | H04L 63/08 |
| 2019/0173860 A1 | 6/2019 | Sankaran | |
| 2019/0342101 A1 | 11/2019 | Hayes | |
| 2020/0106719 A1 | 4/2020 | Acharya | |

* cited by examiner

*Primary Examiner* — Khanh C Tran
(74) *Attorney, Agent, or Firm* — Fletcher Yoder, P.C.

(57) ABSTRACT

A system includes a switch of an electric power distribution system, the switch being configured to receive data and to transmit data, and the system includes a controller configured to communicatively couple to the switch. The controller is configured to create a software defined network by instructing the switch to transmit data to a location, and the controller is configured to generate a set of keys and to provide the set of keys to the switch to enable the switch to communicate data via a Media Access Security (MACsec) communication link, a MACsec key agreement (MKA) connectivity association, or both.

20 Claims, 5 Drawing Sheets

SYSTEMS AND METHODS FOR ESTABLISHING SECURE COMMUNICATION IN AN ELECTRIC POWER DISTRIBUTION SYSTEM WITH SOFTWARE DEFINED NETWORK

BACKGROUND

This disclosure relates to systems and methods for generating and distributing keys for establishing a secure communication link between different components of an electric power distribution system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be noted that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other components of the electric power distribution system during operation of the electric power distribution system. For example, the IED may receive and/or transmit a signal and/or data in order to perform a functionality, such as to control a circuit breaker in response to electrical measurements of the electric power distribution system. Unfortunately, it may be difficult to establish a secure communication link between the IED and other components of the electric power distribution system to enable the components to securely communicate with one another.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, a system includes a switch of an electric power distribution system, the switch being able to receive data and to transmit data, and the system includes a controller that may communicatively couple to the switch. The controller may create a software defined network by instructing the switch to transmit data to a location, and the controller may generate a set of keys and to provide the set of keys to the switch to enable the switch to communicate data via a Media Access Security (MACsec) communication link.

In an embodiment, a switch of an electric power distribution system includes processing circuitry and a memory having instructions that, when executed by the processing circuitry, may cause the processing circuitry to communicate with a controller to receive additional instructions regarding data transmission to setup a software defined network, receive a set of keys from the controller, and establish a Media Access Security (MACsec) communication link, a MACsec key agreement (MKA) connectivity association, or both, with an additional component of the electric power distribution system via the set of keys received from the controller based on the software defined network.

In an embodiment, a tangible, non-transitory, computer readable medium includes instructions that, when executed by processing circuitry, may cause the processing circuitry to perform operations that include transmitting additional instructions to a switch of an electric power distribution system to setup a software defined network, generating a set of keys, and distributing the set of keys to the switch to enable the switch to establish a Media Access Security (MACsec) communication link and a MACsec key agreement (MKA) connectivity association via the set of keys based on the software defined network.

DETAILED DESCRIPTION

Figure 1:
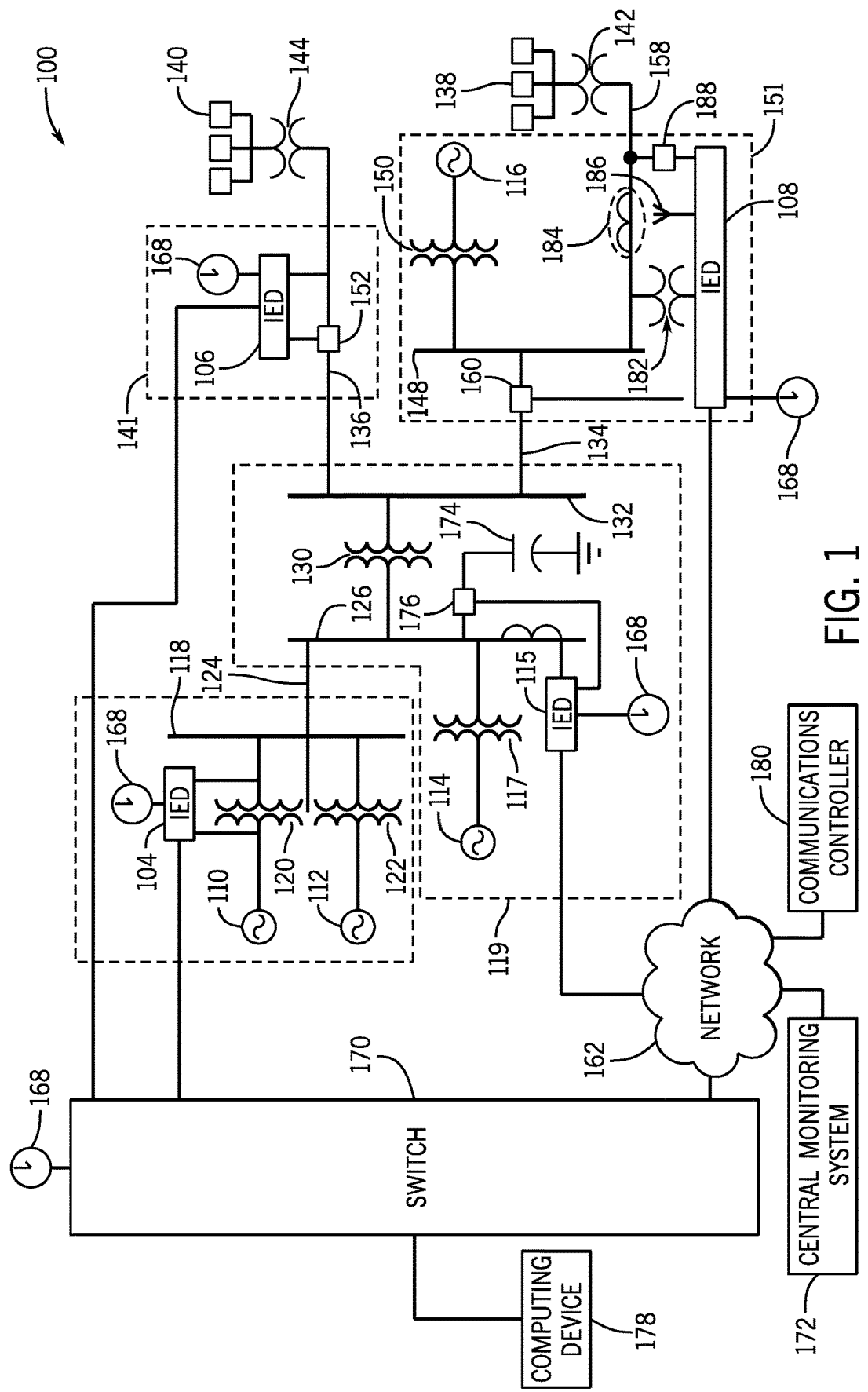
FIG. 1 is a schematic diagram of an embodiment of an electric power distribution system, in accordance with an embodiment of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to establishing a secure communication link between components of an electric power distribution system. Intelligent electronic devices (IEDs) may be used to control certain devices and to perform certain operations of the electric power distribution system. For example, an IED may be a relay that enables or blocks electrical power flow between other components of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of components of the electric power distribution system. As such, the IEDs may facilitate operation of the electric power distribution system.

In certain embodiments, the electric power distribution system may use a software-defined network (SDN) to facilitate communication between various components of the electric power distribution system. For example, the electric power distribution system may have a switch communicatively coupled to various IEDs. The switch may receive data from a first IED and may transmit the data to a second IED in order to enable the IEDs to transmit data between one another. The electric power distribution system may also include a controller communicatively coupled to the switch. The controller may provide instructions to the switch regarding how data is to be transmitted within the electric power distribution system, such as by providing a location or a destination to which the switch is to transmit certain data (e.g., received from one of the IEDs). In this way, the controller may set up operation of the switch to transmit data. In certain embodiments, after setting up the operation of the switch, the controller may be communicatively decoupled from the switch, and the switch may continue to operate to communicate data without having to receive further instructions from the controller.

The controller may also enable the switch to establish secure communications between components of the electric power distribution system. For instance, the controller may generate and provide the switch with a set of keys (e.g., cryptographic keys) for use in implementing a Media Access Control security (MACsec) communication link and/or a MACsec key agreement (MKA) connectivity association to transfer data securely with another component, such as with one of the IEDs and/or a computing device (e.g., a user device). To establish the MACsec communication link, an MKA protocol is initially established between the switch and the other component via an adoption link. During the MKA protocol, the switch may select a copy of a connectivity association key (CAK) from the set of keys received from the controller and may distribute the CAK or a copy of the CAK to the other component via the adoption link. The switch may establish an MKA connectivity association upon verification that the other component possesses the CAK. The switch may then select a copy of a security association key (SAK) from the set of the keys for distribution to the other component via the MKA connectivity association. The switch may retain a copy of the same SAK, and the switch and the other component may use their respective copies of the SAK establish a MACsec communication link for communicating with one another. For example, each of the switch and the other component may encrypt data using their copy of the SAK and/or may decrypt encrypted data using their copy of the SAK in order to transmit data securely between one another.

The switch may establish the MKA connectivity association and/or the MACsec communication link without having to receive further instructions from the controller. That is, the controller may provide the set of keys to the switch, and the switch may store instructions regarding using the received keys to establish the MKA connectivity association and/or the MACsec communication link without having to further communicate with the controller. Thus, after the controller has provided the keys to the switch, the switch may continue to establish secure communication links (e.g., MKA connectivity associations, MACsec communication links) and communicate data via the secure communication links without having to be communicatively coupled to the controller. Indeed, the switch may store the set of keys received from the controller and may continue to select and use keys from the set of keys to establish a new secure communication link and/or to update a currently established secure communication link.

With the preceding in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable or block data flow between any of the IEDs 104, 106, 108, 115. For example, during operation of the electric power distribution system 100, the IEDs 104, 106, 108, 115 may intend transmit data with one another to perform various functionalities for the electric power distribution system 100 by initially transmitting the data to the switch 170. The switch 170 may receive the data and may subsequently transmit the data to an intended recipient of the data. The switch 170 may also control data flow between one of the IEDs 104, 106, 108, 115 and another component communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the switch 170 and/or to send data, such as a user input, to the electric power distribution system 100 via the switch 170. Thus, the switch 170 may enable or block operation of the electric power distribution system 100 via the computing device 178.

A communications controller 180 may interface with equipment in the communications network 162 to create an SDN that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data having a certain set of characteristics or information) to a particular destination (e.g., an intended recipient) using flows, matches, and actions defined by the communications controller 180.

As an example, the switch 170 may receive initial data from one of the IEDs 104, 106, 108, 115 and may communicate with the communications controller 180 to determine the location to which the initial data is to be transmitted. The communications controller 180 may instruct the switch 170 to transmit the initial data to another of the IEDs 104, 106, 108, 115 and/or to an IED of another electric power distribution system 100. Afterward, the switch 170 may automatically transmit subsequent data that is similar to the initial data to the same location indicated by the communications controller 180 without having to be further modified (e.g., manually configured). As another example, the communications controller 180 may directly transmit rules (e.g., flows, matches, actions) to the switch 170 associating certain characteristics of IEDs 104, 106, 108, 115 with a suitable action. For instance, the rules may indicate that data received from an IED associated with a certain information or characteristic (e.g., a port of the IED) is to be routed to a particular other IED In this manner, the switch 170 may determine a relevant rule received from the communications controller 180 (e.g., by matching received information with information associated with the rules) to identify a suitable action to perform as defined by the relevant rule. Indeed, the rules received by the switch may configure the switch 170 to transmit data automatically. Additional techniques for configuring an SDN are further described in U.S. patent application Ser. No. 17/008,901, filed on Sep. 1, 2020, which is incorporated by reference in its entirety for all purposes. In certain embodiments, after the communications controller 180 has configured the switch 170 to transmit data, the communications controller 180 may be communicatively decoupled (e.g., placed offline) from the IEDs 104, 106, 108, 115, and the switch 170 may continue to operate and control data transmission.

In some embodiments, the switch 170 and the IEDs 104, 106, 108, 115 may communicate with one another via a MACsec communication link. The MACsec communication link may be initiated via SAKs distributed to enable encryption and/or decryption of data. To this end, the communications controller 180 or a dedicated key device may generate and distribute keys, such as CAKs and/or SAKs, to the switch 170 via the communications network 162. The switch 170 may use the keys received by the communications controller 180 or the key device to establish secure communication links with the IEDs 104, 106, 108, 115. For instance, the switch 170 may establish an MKA connectivity association with one of the IEDs 104, 106, 108, 115 via an MKA protocol that includes establishing an adoption link between the switch 170 and the IED, distributing a CAK to the IED via the adoption link, establishing an MKA connectivity association with the IED based on a verified possession of the CAK, distributing an SAK to the IED via the MKA connectivity association, and communicating data with the IED using the SAK. Indeed, the switch 170 and the IED may use identical copies of the same SAK to encrypt data to be transferred as well as to decrypt encrypted data that has been received. Such encrypted data is transferred via a MACsec communication link established between the components to transfer the data securely.

The switch 170 may establish MKA connectivity associations and MACsec communication links using the keys received from the communications controller 180 without further communicating with the communications controller 180. That is, after receiving the keys, the switch 170 may establish secure communication links without having to receive further instructions from the communications controller 180. Accordingly, the switch 170 may establish secure communication links with IEDs even when the communications controller 180 is no longer communicatively coupled to the switch 170. Furthermore, the communications controller 180 may store information associated with the keys distributed to the switch 170. For example, the information may be readily available or retrievable, such as by another computing device 178 that is communicatively coupled to the communications controller 180. Such information may be used to acquire additional information regarding the switch 170, such as information associated with the communication between the switch 170 and one of the IEDs 104, 106, 108, 115. Although the present disclosure primarily discusses the use of MKA connectivity associations and MACsec communication links, any other suitable communication techniques may be used to enable data transfer between components of the electric power distribution system 100.

Figure 2:
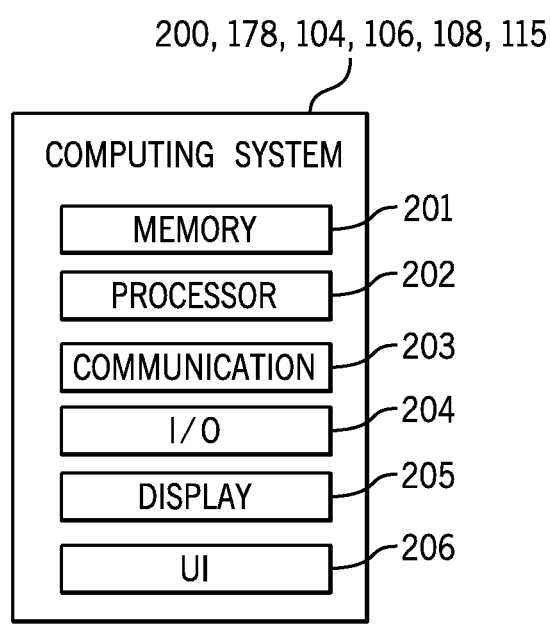
FIG. 2 is a schematic diagram of an embodiment of a computing system that may be incorporated in a component of an electric power distribution system, in accordance with an embodiment of the present disclosure.

FIG. 2 is a schematic diagram of an embodiment of a computing system 200 that may be incorporated within a component of the electric power distribution system 100, such as in any of the IEDs 104, 106, 108, 115, the switch 170, the computing device 178, and/or the communications controller or key device or 180. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another component of the electric power distribution system 100. That is, the communication system 203 enables the computing system 200 (e.g., of one of the IEDs 104, 106, 108, 115) to communication with another communication system 203 of another computing system 200 (e.g., of the switch 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

Figure 3:
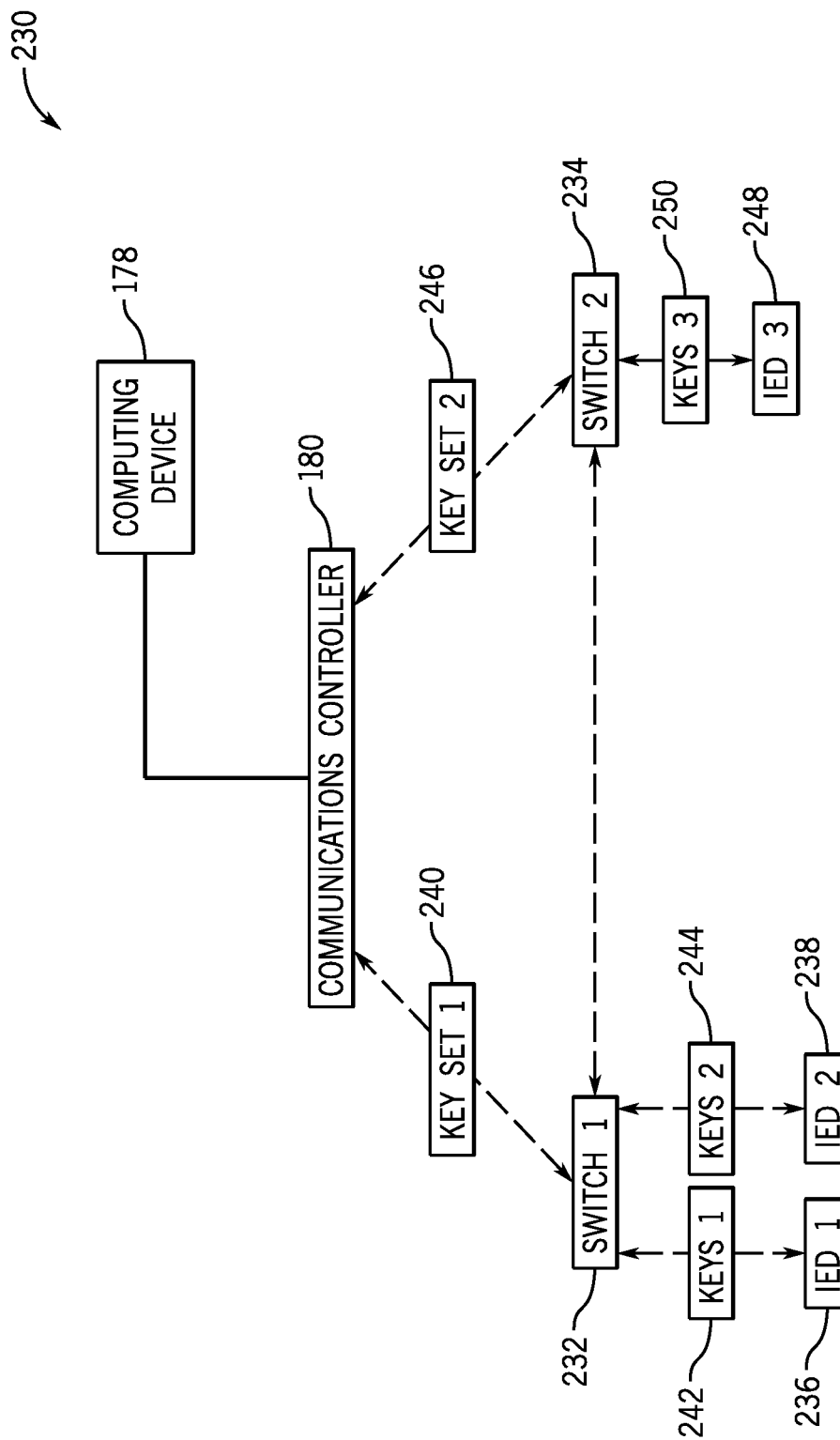
FIG. 3 is a schematic diagram of an embodiment of a communications system that includes a communications controller that distributes keys to a switch of an electric power distribution system, in accordance with an embodiment of the present disclosure.

FIG. 3 is a schematic diagram of an embodiment of a communications system 230 that includes the communications controller 180, which is communicatively coupled to a first switch 232 and to a second switch 234. In some embodiments, the first switch 232 and the second switch 234 may be of the same SDN (e.g., located within the same electric power distribution system 100). In additional or alternative embodiments, the first switch 232 and the second switch 234 may be of different SDNs (e.g., located at different electric power distribution systems 100). Although the illustrated embodiment includes two switches 232, 234, additional or alternative embodiments may include any suitable number of switches communicatively coupled to the communications controller 180.

In any case, each of the first switch 232 and the second switch 234 may transmit data between various IEDs. For example, the first switch 232 may be communicatively coupled to a first IED 236 (e.g., via first MACsec communication link) and to a second IED 238 (e.g., via a second MACsec communication link). The first switch 232 may receive first data (e.g., from the first IED 236) and may determine where to transmit the first data. If the location to which the first data is transmitted is unknown (e.g., the first switch 232 does not include sufficient information to determine where to transmit the first data), the first switch 232 may communicate with the communications controller 180. In response, the communications controller 180 may indicate a first location (e.g., the second IED 238), and the first switch 232 may transmit the first data to the first location in response. Subsequently, the first switch 232 may transmit similar, second data (e.g., similar data received from the first IED 236) to the first location. That is, the first switch 232 may determine that second data shares certain common characteristics with the first data, and the first switch 232 may transmit the second data to the first location indicated by the communications controller 180.

If the first switch 232 receives subsequent data having another unknown location to be transmitted, the first switch 232 may communicate with the communications controller 180 again, the communications controller 180 may indicate a second location, and the first switch 232 may transmit the subsequent data to the second location in response. In this way, the communications controller 180 may configure the first switch 232 and the second switch 234 to transmit different data to corresponding locations. Indeed, the communications controller 180 may provide instructions that enable the first switch 232 and the second switch 234 to automatically transmit any received data to a location without having to be manually modified or otherwise further configured. As a result, after receiving instructions from the communications controller 180, the first switch 232 may continue to operate and control data flow accordingly without having to be communicatively coupled to the communications controller 180. By way of example, the first switch 232 and the second switch 234 may control data flow even when the communications controller 180 is unavailable, such as to reduce operations of the communications controller 180, as a result of a power outage, during maintenance of the electric power distribution system 100, and so forth.

To this end, each of the first switch 232 and the second switch 234 may store the instructions received from the communications controller 180. Thus, the first switch 232 and the second switch 234 may refer to the stored instructions instead of having to communicate with the communications controller 180 each time secure communications is to be established. Moreover, the communications controller 180 may provide keys to the first switch 232 and/or to the second switch 234, and the first switch 232 and/or the second switch 234 may establish the secure communications using the received keys. As an example, prior to there being a secure communication link established between the first switch 232 and the IEDs 236, 238, the communications controller 180 may generate and distribute a first set of keys 240 (e.g., a first set of CAKs, a first set of SAKs) to the first switch 232 for storage at the first switch 232 (e.g. within the memory 201 of the first switch 232). Upon receipt and storage of the first set of keys 240, the first switch 232 may establish a respective secure communication link with the first IED 236 and with the second IED 238. By way of example, the first switch 232 may distribute respective CAKs to the first IED 236 and to the second IED 238 to establish respective MKA connectivity associations (e.g., in response to requests made by the first IED 236 and/or the second IED 238). Upon verification of the possession of the respective CAKs, the first switch 232 may distribute different SAKs to the first IED 236 and to the second IED 238 via the respective MKA connectivity associations. The IEDs 236, 238 may use their respective SAKs to encrypt and decrypt data transmitted with the first switch 232, thereby establishing respective MACsec communication links with the first switch 232.

In this manner, the first switch 232 may use first keys 242 (e.g., first CAKs, first SAKs) of the first set of keys 240 to establish secure communication links (e.g., a first MKA connectivity association, a first MACsec communication link) with the first IED 236, and the first switch 232 may use second keys 244 (e.g., second CAKs, second SAKs) of the first set of keys 240 to establish secure communication links (e.g., a second MKA connectivity association, a second MACsec communication link) with the second IED 238. The first switch 232 may also use keys of the first set of keys 240 to establish secure communication links with any suitable number of subsequent IEDs. Similarly, the communications controller 180 may generate and distribute a second set of keys 246 to the second switch 234 for establishing secure communication links with any suitable number of IEDs, such as with a third IED 248. That is, the second switch 234 may use third keys 250 (e.g., third CAKs, third SAKs) of the second set of keys 246 to establish secure communication links (e.g., a third MKA connectivity association, a third MACsec communication link) with the third IED 248.

In some embodiments, the switches 232, 234 may communicate with one another, such as with a point-to-point communication link. By way of example, the switches 232, 234 may transmit data to one another to enable the first and second IEDs 236, 238 communicatively coupled to the first switch 232 to transmit data with the third IED 248 communicatively coupled to the second switch 234. Indeed, the first switch 232 and the second switch 234 may be communicatively coupled to one another via a point-to-point MKA connectivity association and/or a point-to-point MACsec communication link (e.g., established via symmetrical keys that are common to the first set of keys 240 and to the second set of keys 246) to enable secure data transfer between the switches 232, 234. In this way, the first set of keys 240 and the second set of keys 246 may also be used to enable the switches 232, 234 to securely communicate with one another.

In certain embodiments, each of the first switch 232 and the second switch 234 may change the keys used for establishing the secure communication links with the IEDs 236, 238, 248. That is, as an example, the first switch 232 may select a new or an updated SAK from the first set of keys 240 to distribute to the first IED 236 so as to establish a new or updated MACsec communication link with the first IED 236. As another example, the first switch 232 may select a new or an updated CAK from the first set of keys 240 to distribute to the first IED 236 so as to establish a new or updated MKA connectivity association with the first IED 236. For instance, the first switch 232 and/or the second switch 234 may select new keys for use in establishing secure communication links after a block of time has elapsed. To this end, in some embodiments, the communications controller 180 may associate each key of the sets of keys 240, 246 with validity information (e.g., a time stamp), which may be indicative of a time or a time interval (e.g., an amount of time elapsed after distribution to the switch 232, 234) in which the key is to be used for establishing secure communications. Thus, each switch 232, 234 may use a key so long as the validity information associated with the key includes, corresponds with, or is applicable to a current time. If the validity information associated with the key no longer includes the current time, the switch 232, 234 may select another key to be used based on the validity information associated with the other key including or corresponding with the current time.

In any case, after distributing the first set of keys 240 and/or the second set of keys 246, the communications controller 180 may be communicatively decoupled from the switches 232, 234, but the switches 232, 234 may nevertheless continue to operate, including to maintain the secure communication links with the IEDs 236, 238, 248 and/or to establish new secure communication links with other IEDs. For this reason, the communications controller 180 may distribute a particular number of keys to the switches 232, 234 to enable the switches 232, 234 to operate for a desirable amount of time and/or to enable a desirable amount of data to be transferred without having to communicate with the communications controller 180 (e.g., for obtaining additional keys to update secure communication links and/or to establish new secure communication links).

In certain embodiments, the communications controller 180 may distribute a particular number of keys based on a detected parameter. As an example, the communications controller 180 may distribute a first number (e.g., 1,000, 5,000, 10,000), such as a first relatively large number, of keys in response to determining that communication with the switches 232, 234 may be unavailable for a relatively long block of time (e.g., above a threshold block of time), such as in the event of an anticipated power outage (e.g., as a result of inclement weather). As another example, the communications controller 180 may distribute a second number (e.g., 100, 500, 800), such as a second relatively small number, of keys in response to determining that communication with the switches 232, 234 may be unavailable for a relative short block of time (e.g., below the threshold block of time), such as in the event of a scheduled maintenance. Further still, the detected parameter may be associated with an identified usage of the keys. By way of example, the communications controller 180 may distribute a lower number of keys for the first switch 232 to establish a temporary communication with a component, such as with the computing device 178 to briefly control an operation of the first switch 232. However, the communications controller 180 may distribute a higher number of keys for the first switch 232 to establish a longer communication with a component, such as with the first IED 236. Indeed, the communications controller 180 may distribute less than a dozen keys (e.g., 1 to 11 keys), dozens of keys (e.g., 12 to 99 keys), hundreds of keys (e.g., 100 to 999 keys), thousands of keys (e.g., 1,000 to 999,999 keys), millions of keys (e.g., 1,000,000 to 9,999,999 keys), or any suitable number of keys based on the detected parameter.

In some embodiments, the communications controller 180 may provide an updated or a new set of keys to the switches 232, 234. For instance, the communications controller 180 may provide the updated set of keys after a block of time has elapsed, after an amount of data has been transmitted, at a particular frequency, based on a request from one of the switches 232, 234 (e.g., upon determination that a number of available keys is below a threshold number), based on a user input, and the like. Indeed, in embodiments in which the communications controller 180 communicatively decouples from the switches 232, 234 after distributing the sets of keys 240, 246, the communications controller 180 may communicatively couple to the switches 232, 234 again to distribute subsequent sets of keys.

The communications controller 180 may also store information (e.g., within the memory 201 of the communications controller 180) associated with keys that have been generated and/or distributed. For instance, the communications controller 180 may store a copy of each key that has been generated. The communications controller 180 may additionally or alternatively store information associated with a type of the key, an identity of the switches 232, 234 to where each key was distributed, the validity information associated with each key, and so forth. The communications controller 180 may also provide stored information to a component communicatively coupled to the communications controller 180. In the illustrated embodiment, the computing device 178 is communicatively coupled to the communications controller 180, and the communications controller 180 may provide stored information based on a request transmitted by the computing device 178 to enable a user to enable and/or access such information via the computing device 178. For example, the computing device 178 may request for the first set of keys 240 and, upon receipt of the first set of keys 240 from the communications controller 180, the computing device 178 may use a corresponding one of the first set of keys 240 to communicate with the first switch 232, the first IED 236, and/or the second IED 238.

Each of FIGS. 4 and 5 below illustrates a method of using keys to establish secure communication links within the electric power distribution system 100. In some embodiments, each of the methods may be performed by a single respective component, such as by the computing system 200 (e.g., the processor 202). In additional or alternative embodiments, multiple components may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such at the same time and/or in response to one another.

Figure 4:
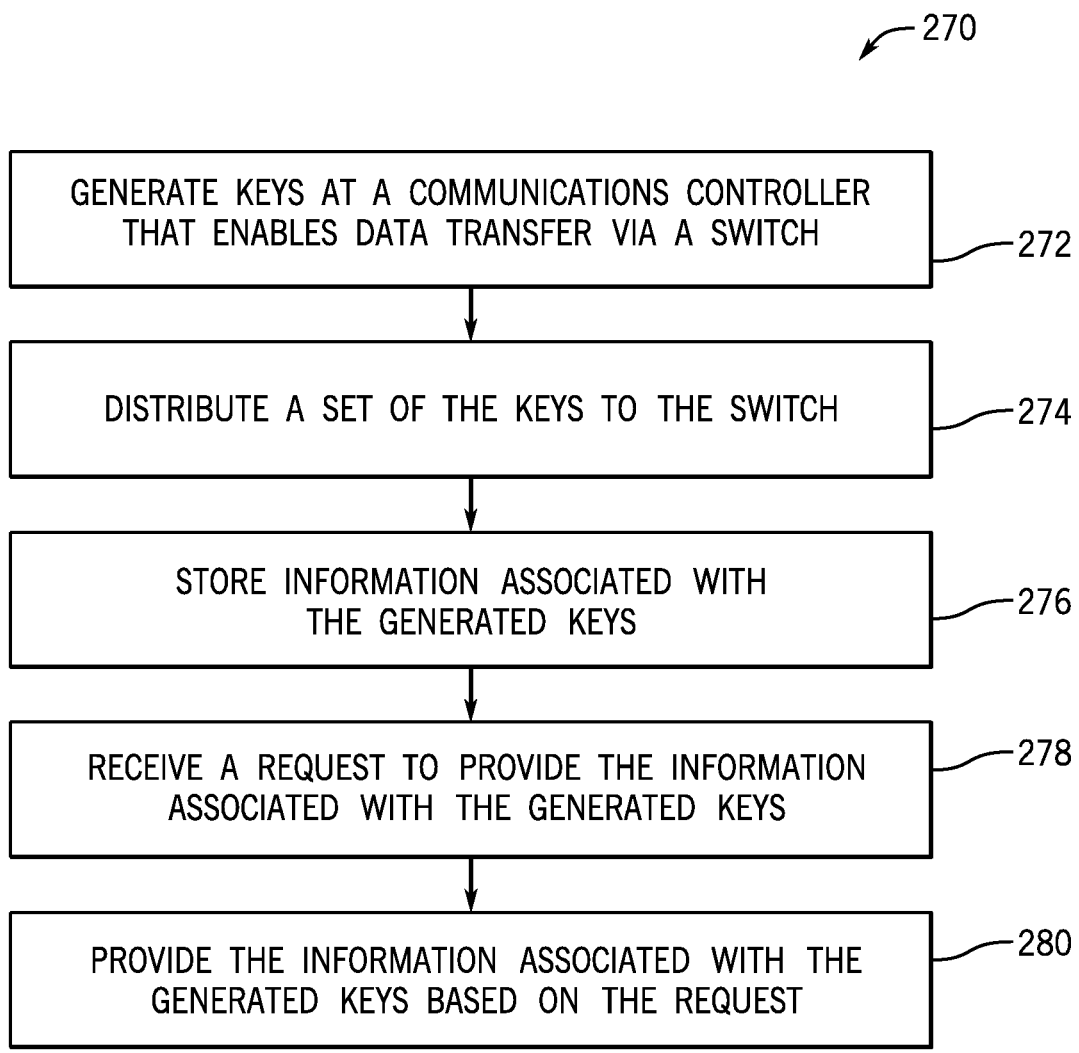
FIG. 4 is a flowchart of an embodiment of a method for generating and distributing keys to establish secure communication links between components of an electric power distribution system, in accordance with an embodiment of the present disclosure.

FIG. 4 is a flowchart of an embodiment of a method 270 for distributing keys to establish secure communication links between components of the electric power distribution system 100, such as between an IED and a switch. The method 270 is described from the perspective of the communications controller 180, and the method 270 may be performed prior to there being an existing secure communication link and/or in order to update an existing secure communication link between the components of the electric power distribution system 100. At block 272, the communications controller 180 may generate keys (e.g., SAKs, CAKs). In some embodiments, the communications controller 180 may generate keys automatically, such as at a particular frequency, after a threshold block of time has elapsed, based on a detected parameter (e.g., a weather condition, a number of keys used by the switches 232, 234, a number of keys available for usage by the switches 232, 234, data transferred using existing keys), based on anticipated unavailability of the communications controller 180 (e.g., due to a scheduled maintenance), in response to another suitable parameter, or any combination thereof. Indeed, the communications controller 180 may receive data, such as sensor data, and may generate a target number of keys based on the received data. In additional or alternative embodiments, the communications controller 180 may generate keys based on an input, such as a user input received via the computing device 178 communicatively coupled to the communications controller 180 and/or a request transmitted by one of the switches 232, 234.

At block 274, after generating the keys, the communications controller 180 may transfer a set of the generated keys to one of the switches 232, 234. In certain embodiments, the communications controller 180 may transfer another set of the generated keys to another one of the switches 232, 234. In any case, at block 276, the communications controller 180 may also store information associated with the generated keys. The communications controller 180 may transmit such stored information.

For example, at block 278, the communications controller 180 may receive a request to provide information associated with the generated keys, such as regarding a particular set of the generated keys. For instance, the request may be transmitted by the computing device 178, such as based on a user input. In response, at block 280, the communications controller 180 may provide the information associated with the generated keys. Indeed, the communications controller 180 may transmit stored information each time a request is received.

As discussed above, the communications controller 180 may generate keys and may distribute keys to the same switch at different times of operation of the electric power distribution system 100. Each time the communications controller 180 generates keys for distribution, the communications controller 180 may also update stored information associated with the newly generated keys. In this manner, the communications controller 180 may repeat performance of the procedures described with respect to block 272, block 274, and/or block 276 at different times.

Figure 5:
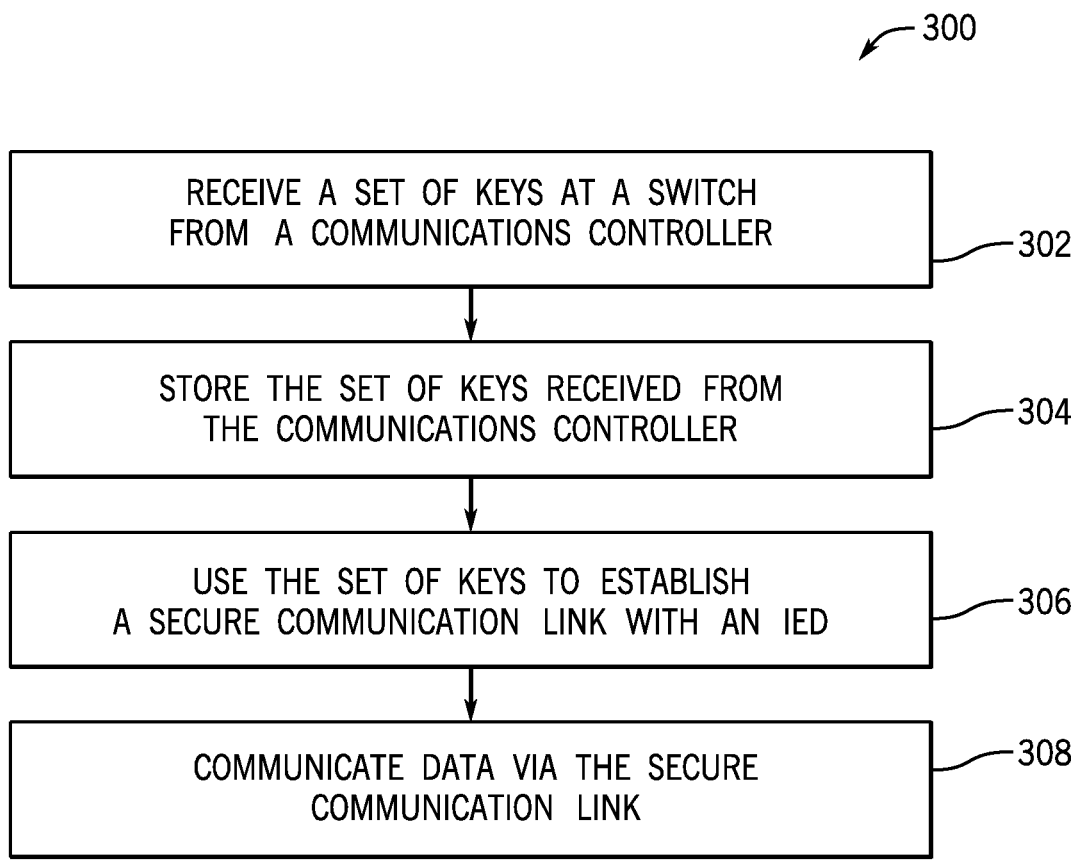
FIG. 5 is a flowchart of an embodiment of a method for using keys to securely communicate data, in accordance with an embodiment of the present disclosure.

FIG. 5 is a flowchart of an embodiment of a method 300 for using keys to securely communicate with an IED Although the method 300 primarily discusses usage of keys to communicate with an IED, techniques described herein may additionally or alternatively be used to securely communicate with another component of the electric power distribution system 100, such as with the computing device 178. The method 300 is described from the perspective of one of the switches 232, 234. At block 302, the switch may receive a set of keys from the communications controller 180, such as keys generated and distributed with respect to block 272 and block 274, respectively, of the method 270. At block 304, the switch may store the set of keys received from the communications controller 180.

At block 306, the switch may use the set of keys to establish a secure communication link with an TED By way of example, the switch may use a CAK of the set of keys to establish an MKA connectivity association with the IED That is, the switch may distribute a copy of the CAK to the IED to establish the MKA connectivity association, which may be maintained so long as the IED is verified to possess the CAK. The switch may also use an SAK of the set of keys to establish a MACsec communication link with the IED. For example, the switch may distribute a copy of the SAK to the IED via the MKA connectivity association.

As a result, at block 308, the switch may communicate with the IED via the MACsec communication link. For instance, the switch may use its copy of the SAK to encrypt data to be transferred to the IED, and the IED may use its copy of the SAK to decrypt encrypted data received from the switch. Similarly, the IED may use its copy of the SAK to encrypt data to be transferred to the switch, and the switch may use its copy of the SAK to decrypt encrypted data received from the IED As mentioned above, the communications controller 180 may generate and distribute sets of keys at different times. The switch may store the set of keys received from the communications controller 180 each time the communications controller 180 distributes a set of keys. As an example, each time the switch receives a new set of keys, the switch may perform the procedure described with respect to block 304 to store the new set of keys and override a previously existing set of keys that may be stored at the switch. In this manner, the switch may select a key from the new set of keys instead of from a previously stored set of keys to establish or maintain secure communications links. Further, the switch may change or update the keys that are used for establishing the secure communication links with the IED By way of example, the switch may select a different CAK to establish a corresponding MKA connectivity association and/or a different SAK to communicate with the IED with a corresponding MACsec communication link. In this manner, the switch may perform the procedures described with respect to block 306 and block 308 multiple times without having to receive a new set of keys from the communication controller 180.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system, comprising:
a switch of an electric power distribution system, wherein the switch is configured to receive data and to transmit data; and
a controller configured to communicatively couple to the switch, wherein the controller is configured to create a software defined network by instructing the switch to transmit data to a location, and the controller is configured to generate a set of keys and to provide the set of keys to the switch to enable the switch to communicate data via a Media Access Security (MACsec) communication link.

2. The system of claim 1, wherein the switch is configured to perform operations comprising:
storing the set of keys received from the controller;
selecting a connectivity association key (CAK) from the set of keys for distribution to an intelligent electronic device (IED) of the electric power distribution system;
establishing a MACsec key agreement (MKA) connectivity association upon verification of the TED possessing the CAK;
selecting a security association key (SAK) from the set of keys for distribution to the IED via the MKA connectivity association to establish the MACsec communication link with the IED; and
communicating data via the SAK and the MACsec communication link.

3. The system of claim 2, wherein the switch is configured to use a first copy of the SAK to encrypt data and transmit the encrypted data to the IED via the MACsec communication link, and the IED is configured to use a second copy of the SAK to decrypt the encrypted data received from the IED.

4. The system of claim 2, wherein the IED is configured to use a first copy of the SAK to encrypt data and transmit the encrypted data to the switch via the MACsec communication link, and the switch is configured to use a second copy of the SAK to decrypt the encrypted data received from the IED.

5. The system of claim 1, wherein the controller is configured to perform operations comprising:
determining a parameter, receiving an input, or both; and
generating the set of keys based on the parameter, the input, or both.

6. The system of claim 5, wherein the parameter comprises a frequency of generating keys, a threshold block of time that has elapsed, a scheduled maintenance, a number of keys used by the switch, a number of keys currently available for usage by the switch, an amount of data transferred by the switch, a weather condition, or any combination thereof.

7. The system of claim 5, wherein the input comprises a request received from the switch, a user input received from a computing device, or both.

8. The system of claim 1, wherein the set of keys comprises 1 to 11 keys, 12 to 99 keys, 100 to 999 keys, 1,000 to 999,999 keys, or 1,000,000 to 9,999,999 keys.

9. The system of claim 1, wherein the controller is configured to perform operations comprising:
storing information associated with the set of keys;
receiving a request to provide the information associated with the set of keys; and
providing the information associated with the set of keys in response to receiving the request.

10. The system of claim 9, wherein the information associated with the set of keys comprises a type of a key of the set of keys, validity information associated with the key of the set of keys, an identity of the switch to where the set of keys was distributed, or any combination thereof.

11. A switch of an electric power distribution system, wherein the switch comprises:
processing circuitry; and a memory comprising instructions that, when executed by the processing circuitry, are configured to cause the processing circuitry to perform operations comprising:
communicating with a controller to receive additional instructions regarding data transmission to setup a software defined network;
receiving a set of keys from the controller; and
establishing a Media Access Security (MACsec) communication link, a MACsec key agreement (MKA) connectivity association, or both, with an additional component of the electric power distribution system via the set of keys received from the controller based on the software defined network.

12. The switch of claim 11, wherein the instructions, when executed by the processing circuitry, are configured to cause the processing circuitry to perform operations comprising:
selecting a connectivity association key (CAK) from the set of keys for distribution to the additional component of the electric power distribution system;
establishing the MKA connectivity association upon verification of the additional component possessing the CAK;
selecting a security association key (SAK) from the set of keys for distribution to the additional component via the MKA connectivity association to establish the MACsec communication link with the additional component; and
communicating data with the additional component via the SAK and the MACsec communication link.

13. The switch of claim 11, wherein the instructions, when executed by the processing circuitry, are configured to cause the processing circuitry to perform operations comprising:
establishing a first MACsec communication link with a first component of the electric power distribution system via a first subset of the set of keys received from the controller; and
establishing a second MACsec communication link with a second component of the electric power distribution system via a second subset of the set of keys.

14. The switch of claim 11, wherein the instructions, when executed by the processing circuitry, are configured to cause the processing circuitry to perform operations comprising:
establishing the MACsec communication link with the additional component of the electric power distribution system at a first time via a first subset of the set of keys received from the controller; and
establishing an updated MACsec communication link with the additional component at a second time via a second subset of the set of keys.

15. The switch of claim 11, wherein the instructions, when executed by the processing circuitry, are configured to cause the processing circuitry to perform operations comprising establishing the MACsec communication link with the additional component without having to receive further instructions from the controller.

16. The switch of claim 11, wherein the additional component comprises an intelligent electronic device, a computing device, or both.

17. A tangible, non-transitory, computer readable medium comprising instructions that, when executed by processing circuitry, are configured to cause the processing circuitry to perform operations comprising:
transmitting additional instructions to a switch of an electric power distribution system to setup a software defined network;
generating a set of keys; and
distributing the set of keys to the switch to enable the switch to establish a Media Access Security (MACsec) communication link and a MACsec key agreement (MKA) connectivity association via the set of keys based on the software defined network.

18. The tangible, non-transitory, computer readable medium of claim 17, wherein the instructions, when executed by the processing circuitry, are configured to communicatively decouple from the switch after transmitting the additional instructions and distributing the set of keys to the switch.

19. The tangible, non-transitory, computer readable medium of claim 17, wherein the instructions, when executed by the processing circuitry, are configured to perform operations comprising:
transmitting further instructions to an additional switch communicatively coupled to the switch via a point-to-point MACsec communication link to setup an additional software defined network;
generating an additional set of keys; and
distributing the additional set of keys to the additional switch to enable the additional switch to establish an additional MACsec communication link via the additional set of keys based on the additional software defined network.

20. The tangible, non-transitory, computer readable medium of claim 17, wherein the set of keys comprises a connectivity association key for establishing the MKA connectivity association, a security association key for encrypting and/or decrypting data, or both.

* * * * *